United States Patent
Hamada et al.

(10) Patent No.: US 8,411,992 B2
(45) Date of Patent: Apr. 2, 2013

(54) IMAGE PROCESSING DEVICE AND ASSOCIATED METHODOLOGY OF PROCESSING GRADATION NOISE

(75) Inventors: Takehiro Hamada, Kanagawa (JP); Nobuhiro Tsunashima, Kanagawa (JP)

(73) Assignee: Sony Corporation, Tokyo (JP)

( * ) Notice: Subject to any disclaimer, the term of this patent is extended or adjusted under 35 U.S.C. 154(b) by 675 days.

(21) Appl. No.: 12/639,540

(22) Filed: Dec. 16, 2009

(65) Prior Publication Data

US 2010/0177982 A1 Jul. 15, 2010

(30) Foreign Application Priority Data

Jan. 9, 2009 (JP) ................................ 2009-003459

(51) Int. Cl.
- G06K 9/40 (2006.01)
- G09G 1/14 (2006.01)
- G09G 3/28 (2006.01)
- G09G 3/30 (2006.01)
- G09G 5/00 (2006.01)
- G09G 5/02 (2006.01)
- G09G 5/10 (2006.01)
- H04N 9/64 (2006.01)
- H04N 5/202 (2006.01)
- H04N 5/00 (2011.01)
- H04N 1/40 (2006.01)

(52) U.S. Cl. .......... 382/275; 382/274; 382/254; 345/20; 345/63; 345/77; 345/581; 345/596; 345/690; 348/251; 348/254; 348/606; 358/461

(58) Field of Classification Search .................. None
See application file for complete search history.

(56) References Cited

U.S. PATENT DOCUMENTS

| | | | | |
|---|---|---|---|---|
| 5,832,141 A * | 11/1998 | Ishida et al. | .................. | 382/298 |
| 5,956,432 A * | 9/1999 | Ohta | .............................. | 382/264 |
| 6,924,778 B2 * | 8/2005 | Awamoto et al. | ............... | 345/60 |
| 2002/0190925 A1 * | 12/2002 | Awamoto et al. | ............... | 345/60 |
| 2008/0049239 A1 * | 2/2008 | Chiaki et al. | .................. | 358/1.9 |
| 2008/0239355 A1 * | 10/2008 | Goto et al. | ..................... | 358/1.9 |

FOREIGN PATENT DOCUMENTS

| | | |
|---|---|---|
| JP | 2006-246080 | 9/2006 |
| JP | 2007-536662 | 12/2007 |

* cited by examiner

*Primary Examiner* — Randolph I Chu
(74) *Attorney, Agent, or Firm* — Oblon, Spivak, McClelland, Maier & Neustadt, L.L.P.

(57) ABSTRACT

An image processing device includes: an estimated plane calculation portion calculating, for inputted image data, estimated planes defined by luminance values in blocks each containing a predetermined number of pixels including a reference pixel; an optimal estimated plane selection portion selecting an optimal estimated plane having a least summation of errors between luminance values of respective pixels in a block and an estimated plane among the estimated planes; a weighting factor calculation portion calculating a weighting factor for the reference pixel base on luminance values of the reference pixel and in the optimal estimated plane; and a weighted smoothing portion computing a sum of products of relative luminance differences between the luminance values of the respective pixels in the block and in the optimal estimated plane and the weighting factor for the reference pixel and adding a luminance value in the optimal estimated plane at a reference pixel position to a result of computation.

7 Claims, 6 Drawing Sheets

ESTIMATED PLANE OF
REFERENCE BLOCK

FIG.3B

ESTIMATED PLANE OF
NEIGHBORING BLOCK 1

FIG.3C

ESTIMATED PLANE OF
NEIGHBORING BLOCK 2

FIG.3D

ESTIMATED PLANE OF
NEIGHBORING BLOCK 8

FIG.4A

ESTIMATED PLANE OF REFERENCE BLOCK

FIG.4B

ESTIMATED PLANE OF NEIGHBORING BLOCK 1

FIG.4C

ESTIMATED PLANE OF NEIGHBORING BLOCK 2

FIG.5A ESTIMATED PLANE OF REFERENCE BLOCK

FIG.5B ESTIMATED PLANE OF NEIGHBORING BLOCK 1

FIG.5C ESTIMATED PLANE OF NEIGHBORING BLOCK 2

FIG.6

IMAGE PROCESSING DEVICE AND ASSOCIATED METHODOLOGY OF PROCESSING GRADATION NOISE

BACKGROUND OF THE INVENTION

1. Field of the Invention

The present invention relates to image processing that applies denoising to image data having noises.

2. Description of Related Art

A widespread use of digital cameras in recent years makes it necessary to restore a digital image often taken under unfavorable conditions. In particular, an image taken at low-light intensity like in night time has noises because an amount of light inputted into the camera is small. For example, in the case of a nightwatch camera, influences of noises make it difficult to discriminate the face of an individual or a vehicle license plate number to be subjected to surveillance. In order to overcome this inconvenience, a scheme to remove a noise from an image having noises is necessary. Such a scheme is achieved by a technique generally referred to as noise reduction.

The purpose of noise reduction is to remove noises. It is, however, also desirable to preserve a detailed portion of an original image (an image having no noises) as intact as possible. For example, it is undesirable to remove a noise from an image of a license plate by noise reduction to the extent that characters on the plate are smeared and become illegible. Noise reduction therefore aims at removing noises alone as much as possible in order to preserve an edge portion of an original image as intact as possible by using a deteriorated image (an image having noises).

The simplest method of noise reduction is smooth filtering (low-pass filtering). This method cuts information of a high-frequency band where considerable noise components are contained and is therefore capable of removing noises. However, because a detailed portion (edge) of an image is also contained in the high-frequency band, sharpness is lost because of smoothing.

An example of a noise reduction scheme in consideration of edge preservation is bilateral filtering (C Tomasi and R Manduchi, "Bilateral filtering for gray and color images", *Computer Vision*, 1998). Bilateral filtering is a type of weighted smooth filtering but it achieves noise reduction that enables edge preservation by devising a way to find a weighting factor. The weighting factor is determined by the following two indices.

One index is a distance difference between a reference pixel and a neighboring pixel. Given that a relation with the reference pixel becomes lower as a distance from the reference pixel becomes longer, the weighting factor is made smaller. Conversely, given that a relation with the reference pixel becomes higher as a distance from the reference pixel becomes shorter, the weighting factor is made larger.

The other index is a luminance difference between a reference pixel and a neighboring pixel. Given that a relation with the reference pixel becomes lower as a luminance difference becomes larger, the weighting factor is made smaller. Also, given that a relation with the reference pixel becomes higher as a luminance difference becomes smaller, the weighting factor is made larger.

As has been described, because the weighting factor is determined particularly by a luminance difference by bilateral filtering, edge preservation is satisfactory. Bilateral filtering has an advantage that it achieves satisfactory edge preservation by applying smooth filtering to a region where a luminance is uniform on one hand and by making the weighting factor smaller for a pixel having a large luminance difference on the other hand.

Besides the above scheme, many schemes have been proposed as a noise reduction scheme in consideration of edge preservation, for example, in JP-T-2007-536662 (hereinafter, referred to the cited reference 1) and JP-A-2006-246080 (hereinafter, referred to as the cited reference 2).

A technique described in the cited reference 1 is to calculate a weighting factor by comparing luminance differences on a block-by-block basis by bilateral filtering described above. This technique makes it possible to distinguish a texture having a spatial correlation from noises. The preservation quality of the texture can be therefore enhanced in comparison with bilateral filtering. It thus becomes possible to achieve excellent denoising performance.

According to a technique described in the cited document 2, noise reduction with excellent edge preservation is achieved by using both bilateral filtering and unsharp masking.

SUMMARY OF THE INVENTION

The techniques described above, however, have a problem that denoising performance is poor for an image having gradation (a region in which the luminance varies in a planer manner). Herein, a first-order differentiable region is defined as a gradation portion. A luminance value of a pixel in the gradation portion is a sum of a bias caused by a plane defined by gradation and noises.

Because neither of the techniques described above gives considerations to a bias caused by a plane defined by gradation when the weighting factor is calculated, a luminance difference between a reference pixel and a neighboring pixel increases correspondently. Consequently, substantially no neighboring pixel close to the reference pixel (in terms of luminance value) is present in the gradation portion and the weighting factor becomes so small that noises are left unremoved.

Thus, it is desirable to provide an image processing device, an image processing method, a program, and an imaging device each achieving excellent denoising performance.

According to an embodiment of the present invention, there is provided an image processing device including: an estimated plane calculation portion that calculates, for inputted image data, a plurality of estimated planes defined by luminance values on a block-by-block basis, each block containing a predetermined number of pixels including a reference pixel to be subjected to filter processing; an optimal estimated plane selection portion that selects an optimal estimated plane having a least summation of errors between luminance values of respective pixels in a block and luminance values in an estimated plane among the plurality of estimated planes; a weighting factor calculation portion that calculates a weighting factor for the reference pixel on the basis of a luminance value of the reference pixel and a luminance value in the optimal estimated plane; and a weighted smoothing portion that computes a sum of products of relative luminance differences between the luminance values of the respective pixels in the block and luminance values in the optimal estimated plane and the weighting factor for the reference pixel and adds a luminance value in the optimal estimated plane at a reference pixel position to a result of computation.

According to another embodiment of the present invention, there is provided an image processing method including the steps of: calculating, for input image data, a plurality of estimated planes defined by luminance values on a block-by-block basis, each block containing a predetermined number of pixels including a reference pixel to be subjected to filter processing; selecting an optimal estimated plane having a least summation of errors between luminance values of respective pixels in a block and luminance values in an estimated plane among the plurality of estimated planes; calculating a weighting factor for the reference pixel on the basis of a luminance value of the reference pixel and a luminance value in the optimal estimated plane; and computing a sum of products of relative luminance differences between the luminance values of the respective pixels in the block and luminance values in the optimal estimated plane and the weighting factor for the reference pixel and adding a luminance value in the optimal estimated plane at a reference pixel position to a result of computation.

According to still another embodiment of the present invention, there is provided a program causing an information processing device to perform the following steps: calculating, for input image data, a plurality of estimated planes defined by luminance values on a block-by-block basis, each block containing a predetermined number of pixels including a reference pixel to be subjected to filter processing; selecting an optimal estimated plane having a least summation of errors between luminance values of respective pixels in a block and luminance values in an estimated plane among the plurality of estimated planes; calculating a weighting factor for the reference pixel on the basis of a luminance value of the reference pixel and a luminance value in the optimal estimated plane; and computing a sum of products of relative luminance differences between the luminance values of the respective pixels in the block and luminance values in the optimal estimated plane and the weighting factor for the reference pixel and adding a luminance value in the optimal estimated plane at a reference pixel position to a result of computation.

According to yet another embodiment of the present invention, there is provided an imaging device including: an imaging portion; an estimated plane calculation portion that calculates, for image data obtained by the imaging portion, a plurality of estimated planes defined by luminance values on a block-by-block basis, each block containing a predetermined number of pixels including a reference pixel to be subjected to filter processing; an optimal estimated plane selection portion that selects an optimal estimated plane having a least summation of errors between luminance values of respective pixels in a block and luminance values in an estimated plane among the plurality of estimated planes; a weighting factor calculation portion that calculates a weighting factor for the reference pixel on the basis of a luminance value of the reference pixel and a luminance value in the optimal estimated plane; and a weighted smoothing portion that computes a sum of products of relative luminance differences between the luminance values of the respective pixels in the block and luminance values in the optimal estimated plane and the weighting factor for the reference pixel and adds a luminance value in the optimal estimated plane at a reference pixel position to a result of computation.

According to the embodiments of the present invention, an optimal estimated plane having the least error between the luminance values of the respective pixel in the block and the luminance values in an estimated plane is determined and the weighting factor for the reference pixel is calculated on the basis of the luminance value of the reference pixel and a luminance value in the optimal estimated plane. Hence, not only is it possible to achieve denoising of a gradation portion that has been unfeasible in the related art, but it is also possible to preserve a detailed portion (edge or the like) of the image data.

DESCRIPTION OF THE PREFERRED EMBODIMENTS

Hereinafter, embodiments of the present invention will be described specifically with reference to the drawings in the following order.

1. Camera configuration with reference to FIG. 1
2. Image processing example 1 with reference to FIG. 2 through FIG. 5C
3. Image processing example 2
4. Modification with reference to FIG. 6

1. Camera Configuration

Figure 1:
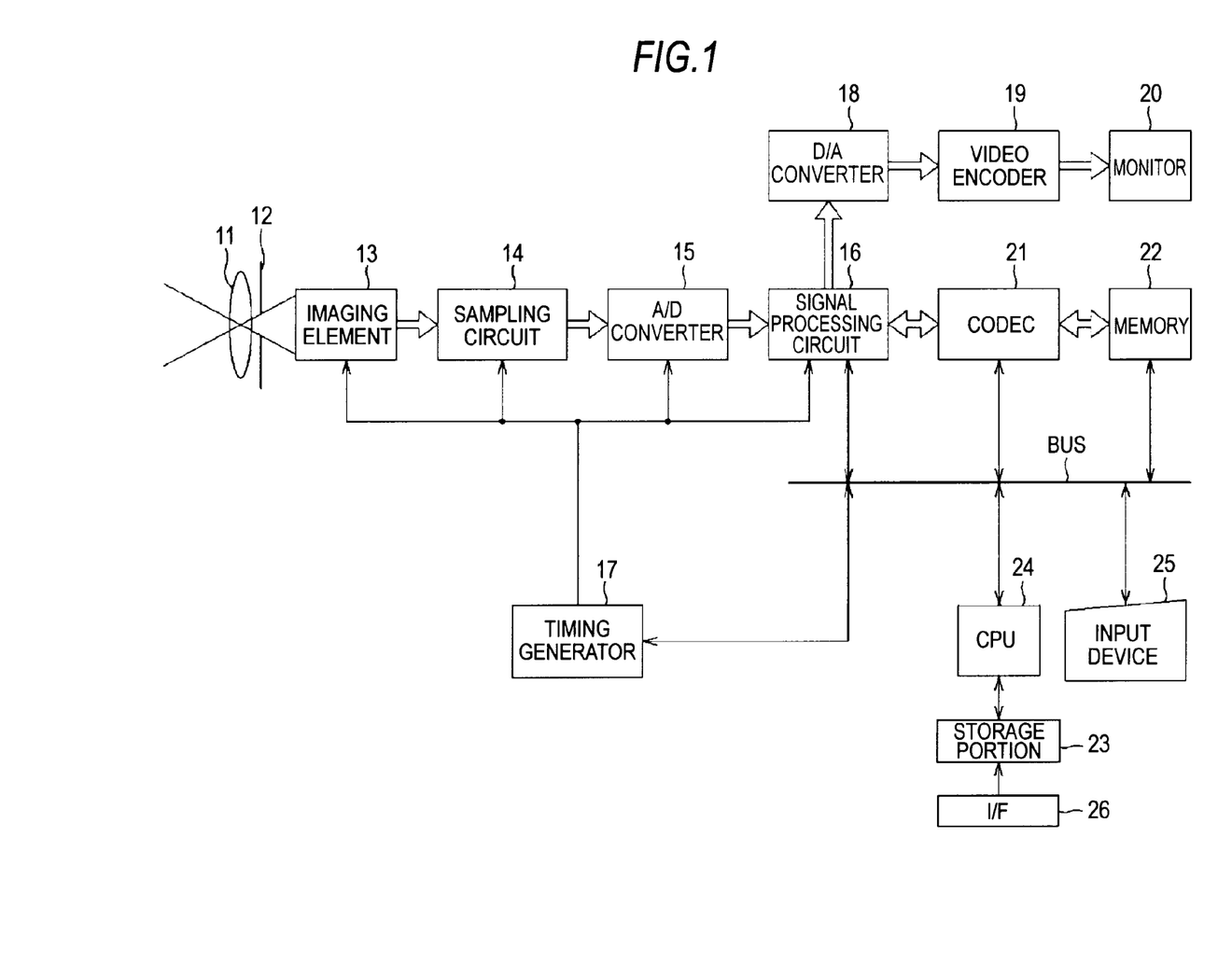
FIG. 1 is a block diagram showing the configuration of a camera according to an embodiment of the invention.

FIG. 1 shows an example of a camera configuration according to an embodiment of the present invention. Light from a subject is collected onto an imaging element 13 by an optical system, such as a lens 11 and an aperture 12.

The imaging element 13 is formed, for example, of a CCD (Charge Coupled Device), a CMOS (Complementary Metal Oxide Semiconductor) imager, or the like. It converts received light into an electric signal and outputs the electric signal to a correlated double sampling circuit 14. More specifically, the imaging element 13 receives light coming from the subject via the lens 11 and the aperture 12 for a predetermined exposure time at regular intervals according to a timing signal supplied from a timing generator 17. The imaging element 13 then converts an amount of light having reached respective light-receiving elements on the imaging area to an electric signal by photoelectric conversion and supplies the correlated double sampling circuit 14 with the converted electric signal.

The correlated double sampling circuit 14 removes a noise component in the electric signal supplied from the imaging element 13 by correlated double sampling and supplies an A/D (Analog/Digital) converter 15 with the resulting electric signal. The A/D converter 15 converts the electric signal supplied from the correlated double sampling circuit 14 from analog form to digital form (by sampling followed by quantization) and supplies a signal processing circuit 16 with the resulting image data.

The signal processing circuit 16 is formed, for example, of a DSP (Digital Signal Processor). It applies various types of image processing (camera signal processing) to the image data supplied from the A/D converter 15 and supplies a D/A (Digital/Analog) converter 18 or a codec 21 with the image data after the image processing.

The timing generator 17 generates timing signals that specify timing of various types of processing and supplies the imaging element 13, the correlated double sampling circuit 14, the A/D converter 15, and the signal processing circuit 16 with the timing signals.

The D/A converter 18 converts the image data supplied from the signal processing circuit 16 from digital form to analog form and supplies a video encoder 19 with the resulting image signal. The video encoder 19 converts the image signal (analog signal) supplied from the D/A converter 18 to a signal that can be displayed on a monitor 20 and supplies the monitor 20 with the converted signal. The monitor 20 plays a role of a viewfinder of a digital camera and is formed of an LCD (Liquid Crystal Display) so as to display an image thereon according to the signal supplied from the video encoder 19. A so-called through image is thus displayed on the monitor 20.

The codec 21 encodes the image data supplied from the signal processing circuit 16 according to a predetermined method, such as the JPEG (Joint Photographic Experts Group) method, the MPEG (Moving Picture Experts Group) method, and the DV (Digital Video) method, and supplies a memory 22 with the encoded image data.

The memory 22 is formed of a semiconductor memory, such as a flash memory, and stores (records) the encoded image data supplied from the codec 21. It should be noted, however, that a recording medium, such as a magnetic disk, an optical (magnetic) disc, and a magnetic tape, can be used instead of the memory 22. The memory 22 or the recording medium may be formed attachable to and detachable from the digital camera. Also, it is possible to provide both a recording medium incorporated in the digital camera and a recording medium attachable to and detachable from the digital camera.

A storage portion 23 is formed of a non-volatile memory, such as an EEPROM (Electrically Erasable Programmable Read Only Memory), or a combination of a non-volatile memory and a volatile memory, such as a RAM (Read Only Memory). The storage portion 23 stores a program run on a CPU (Central Processing Unit) 24 and temporarily stores data necessary for the processing performed by the CPU 24.

The CPU 24 performs various types of processing by running a program stored in the storage portion 23. More specifically, the CPU 24 supplies the respective portions, such as the signal processing circuit 16, the timing generator 17, the codec 21, and the memory 22, with control signals via a bus according to a signal supplied from an input device 25, for example, in response to an operation by the user, and thereby controls the respective portions.

The input device 25 has operation buttons, such as a release button (shutter button) that provides a shooting (imaging) trigger, an exposure correction dial operated when the exposure during the shooting is corrected, and a zoom button (zoom lever) operated when the zooming is adjusted. Various types of signals generated in response to operations on the operation buttons by the user are supplied from the input device 25 to the CPU 24 via the bus and the CPU 24 controls the respective portions to perform processing according to various signals supplied from the input device 25 via the bus. It should be noted that one or more operation button of the input device 25 can be displayed on the monitor 20. For example, a transparent tablet may be provided on the monitor 20, so that an operation on the operation button displayed on the monitor 20 is detected by the tablet.

An I/F (Interface) 26 is an interface that makes communications, for example, in accordance with USB (Universal Serial Bus) standards, IEEE (Institute of Electrical and Electronics Engineers) 1394 standards, or IEEE802 standards. When connected to an external computer or the like via the I/F 26, the digital camera becomes able to update the program stored in the storage portion 23 and execute transmission and reception of various types of data including the image data.

In the digital camera configured as above, light from the subject goes incident on the imaging element 13 via the optical system, such as the lens 11 and the aperture 12. The imaging element 13 receives incident light from the subject and photoelectrically converts the received light. An image (data) obtained as a result of photoelectric conversion in the imaging element 13 is supplied to the signal processing circuit 16 via the correlated double sampling circuit 14 and the A/D converter 15.

The signal processing circuit 16 applies image processing for denoising and edge preservation described below on the inputted image data. The image data after the image processing is supplied to the monitor 20 via the D/A converter 18 and the video encoder 19 and displayed thereon. The image after the image processing is supplied to the memory 22 via the codec 21 and stored therein when the necessity arises.

2. Image Processing Example 1

Image processing by the signal processing circuit 16 will now be described. The image processing described as a specific example is to remove noises in a gradation portion (a region in which the luminance varies in a planar manner) by estimating a plane defined by the luminance values of the gradation portion and calculating a weighting factor for smoothing using this plane. Further, the image processing is to preserve a detailed portion (edge or the like) of the image data by using an optimal plane having the least error when the weighting factor is calculated.

Figure 2:
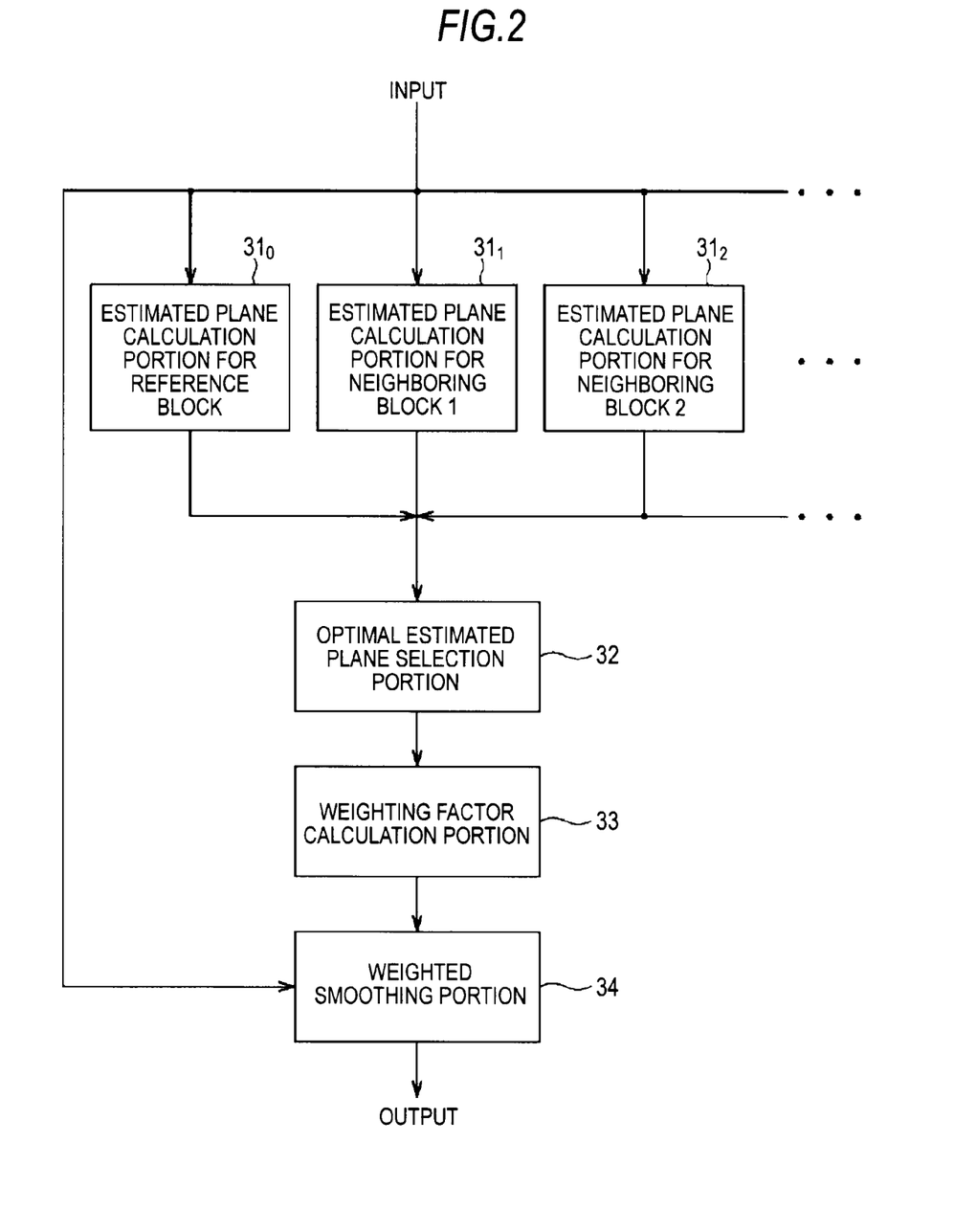
FIG. 2 is a functional block diagram showing the configuration of an image processing device to which the present invention is applied.

The image processing is achieved, for example, by furnishing the signal processing circuit 16 in the digital camera described above with a function of an image processing device shown in FIG. 2. FIG. 2 is a functional block diagram showing the configuration of the image processing device to which the present invention is applied. The image processing device includes estimated plane calculation portions $31_0$ through $31_n$ (n is a positive integer), an optimal estimated plane selection portion 32, a weighing factor calculation portion 33, and a weighted smoothing portion 34.

The estimated plane calculation portions $31_0$ through $31_n$ calculate, for the image data, a plurality of estimated planes defined by the luminance values on a block-by-block basis, each block containing a predetermined number of pixels including a reference pixel to be subjected to filter processing. To be more specific, an estimated plane is calculated using all the pixels in a block (hereinafter, referred to as the reference block) of an arbitrary size (n×n, where n is an odd number equal to 3 or larger) having an arbitrary pixel to be subjected to filter processing (hereinafter, referred to as the reference pixel) at the center. For example, for the reference pixel and eight pixels in the neighborhood of the reference pixel (hereinafter, referred to as the neighboring pixels), nine estimated planes are calculated using all the pixels in respective blocks (hereinafter, referred to as the neighboring blocks) of an arbitrary size (m×m, where m is an odd number equal to 3 or larger) having the reference pixel and the respective neighboring pixels at the center.

Herein, it is preferable that the reference block and the neighboring blocks are of the same size (n=m). When configured in this manner, the calculation processing can be the same in all the estimated plane calculation portions $31_0$ through $31_n$, which can in turn make the configuration of the estimated plane calculation portions $31_0$ through $31_n$ simpler. A calculation method of the estimated planes can be, for example, the method of least squares. According to the method of least squares, an estimated plane is calculated to have the least summation of square errors (a square sum of errors) between the luminance values of the respective pixels in a block and the plane.

The optimal estimated plane selection portion 32 selects an optimal estimated plane having the least summation of errors between the luminance values of the respective pixels in the block and the luminance values in an estimated plane among a plurality of estimated planes. To be more specific, in a case where estimated planes are calculated using the method of least squares in the estimated plane calculation portions $31_0$ through $31_n$, an estimated plane having the least summation of square errors is selected.

The weighting factor calculation portion 33 calculates a weighting factor for the reference pixel on the basis of the luminance value of the reference pixel and a luminance value in the optimal estimated plane. A specific calculation method will be described below.

The weighted smoothing portion 34 smoothes the reference pixel by computing a sum of products of relative luminance differences between the luminance values of the respective pixels in the block and the luminance values in the optimal estimated plane and the weighting factor for the reference pixel and adding the luminance value in the optimal estimated plane at the reference pixel position to the result of computation.

According to the image processing device as described above, planes defined by the luminance values of pixels in the reference block and in the neighboring blocks are estimated for the image data and weighted smooth filtering using the estimated planes is constructed. By constructing the weighted smooth filtering using the optimal estimated plane having the least error, it becomes possible to achieve not only denoising of the gradation portion in which the luminance in the image varies in a planar manner but also preservation of the edge portion in which a specific feature varies abruptly at the same time.

A specific example of an operation by the image processing device as above will now be described. Herein, descriptions will be given on the assumption that the reference block and the neighboring blocks have a size of 3 pixels×3 pixels.

Figure 3A:
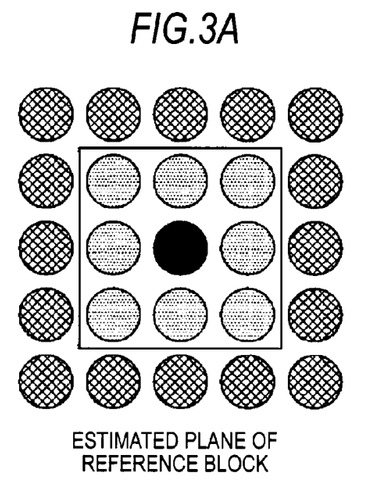
FIG. 3A through FIG. 3D are views used to describe a calculation method of estimated planes.
Figure 3B:
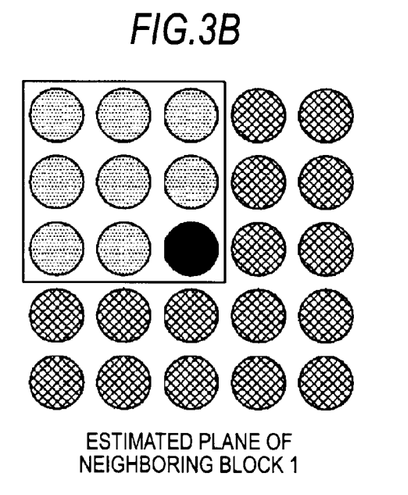
Figure 3C:
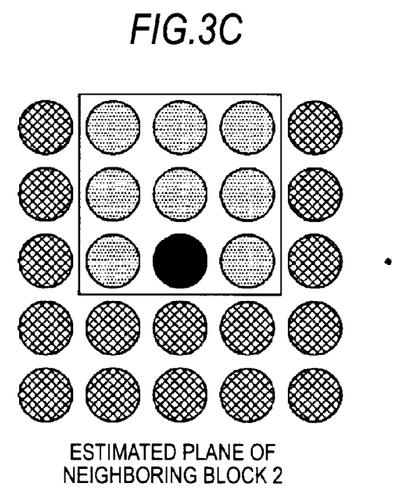
Figure 3D:
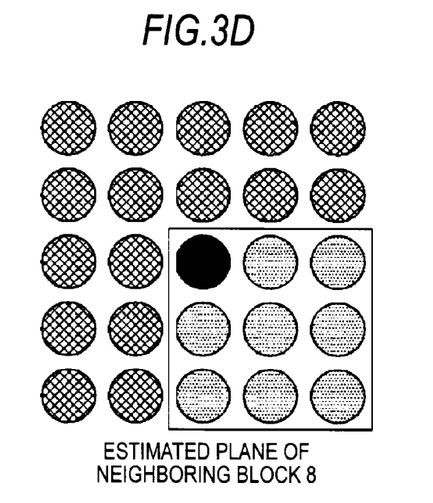

Initially, image data inputted into the estimated plane calculation portions $31_0$ through $31_n$ is processed on a block-by-block basis, each block containing 3 pixels×3 pixels including the reference pixel to be subjected to filter processing. As is shown in FIG. 3A, a plane having the least error for all the pixels in the reference block made up of the reference pixel and the eight neighboring pixels is estimated in the estimated plane calculation portion $31_0$. Also, as is shown in FIG. 3B, a plane having the least error for all the pixels in a neighboring block having the neighboring pixel in the upper right of the reference pixel among the eight neighboring pixels at the center is estimated in the estimated plane calculation portion $31_1$. Likewise, as are shown in FIG. 3C and FIG. 3D, planes for the pixels in the neighboring blocks containing the reference pixel and having the respective remaining neighboring pixels at the center are estimated in the estimated plane calculated portions $31_2$ through $31_8$. These estimated planes are calculated by the method of least squares to have the least square error between the respective luminance values in the blocks and the respective luminance values in the planes. The estimated plane by the reference block and the estimated planes by the respective neighboring blocks, that is, a total of nine estimated planes are obtained by these computations.

The optimal estimated plane selection portion 32 selects the optimal estimated plane among the nine estimated planes calculated in the estimated plane calculation portions $31_0$ through $31_n$. The term, "optimal", referred to herein is defined to have the least summation of square errors between the respective luminance values in the block and the respective luminance values in the plane. For example, in the case of estimated planes for the reference block and the estimated planes for the neighboring blocks shown in FIG. 4A through FIG. 5C, the estimated planes shown in FIG. 4B and FIG. 5B having a small summation of square errors between the respective luminance values in the block and the respective luminance values in the plane are selected. The estimated plane selected in this manner is referred to as the optimal estimated plane.

Subsequently, the weighting factor calculation portion 33 finds a weighting factor for weighted smooth filtering using the optimal estimated plane. Factors that determine the weighting factor are, in the case of bilateral filtering, distance differences and luminance differences between the reference pixel and the neighboring pixels. Herein, the factor is relative luminance differences from the optimal estimated plane regarding the term of the luminance difference. To be more specific, the relative luminance differences are found in the following manner. That is, for the reference pixel, a difference between the luminance value of the reference pixel and a luminance value in the optimal estimated plane at the corresponding position is calculated as the relative luminance difference. Likewise, for the neighboring pixels, a difference between the luminance value of a neighboring pixel and a luminance value in the optimal estimated plane at the corresponding position is calculated as the relative luminance difference.

The weighting factor is determined by a function using a difference between the relative luminance difference of the reference pixel and the relative luminance differences of the neighboring pixels as an input. Any function with compact support (that will be 0 outside a given bounded interval) is available. The function can be, for example, a Gaussian function (that will be 0 outside an appropriate interval).

Finally, the weighted smoothing portion 34 computes a sum of products of the weighting factor and the relative luminance differences obtained for the reference pixel. The luminance value in the optimal estimated plane at the position corresponding to the reference pixel is added to the computation result. The value thus obtained is the result of the filter processing applied to the reference pixel.

By performing the computations as above for all the pixels in the input image data, noises in the gradation portion are removed. It thus becomes possible to obtain an image in which a detailed portion (edge or the like) is preserved. This is because a bias caused by a plane defined by gradation is subtracted so that the luminance differences are evaluated in the noise portion alone by the image processing according to the embodiment of the present invention. To be more specific, as has been described, a plane defined by gradation is estimated, for example, by the method of least squares and the noise portion is extracted by subtracting the luminance values of the estimated plane from the luminance values of the original image data. Then, by applying the filtering on the extracted noise portion alone, denoising can be applied to the gradation portion.

Figure 4A:
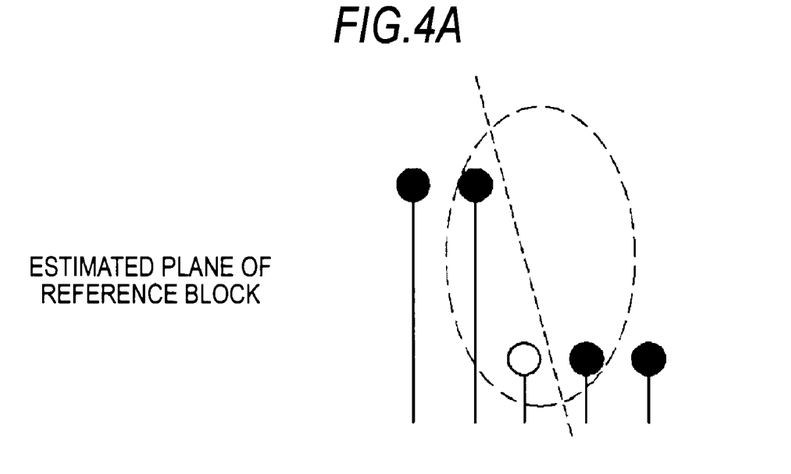
FIG. 4A through FIG. 4C are views used to describe estimated planes of an edge portion.
Figure 5A:
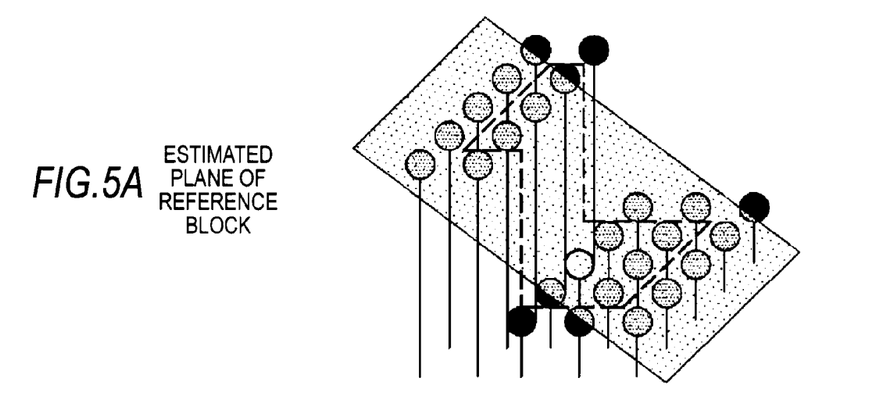
FIG. 5A through FIG. 5C are views used to describe estimated planes of an edge portion.

Incidentally, this processing is performed on the assumption that pixels in the block form a plane. Accordingly, when this processing is applied to a portion other than a plane (for example, the edge portion), the result is unsatisfactory (the edge is blurred). For example, in the presence of an edge portion in the reference block as are shown in FIG. 4A and FIG. 5A, an error between the luminance values of the pixels in the reference block and the luminance values in the estimated plane becomes larger. Hence, when the filter processing is applied by calculating the weighting factor using this estimated plane, the edge is blurred.

Figure 4B:
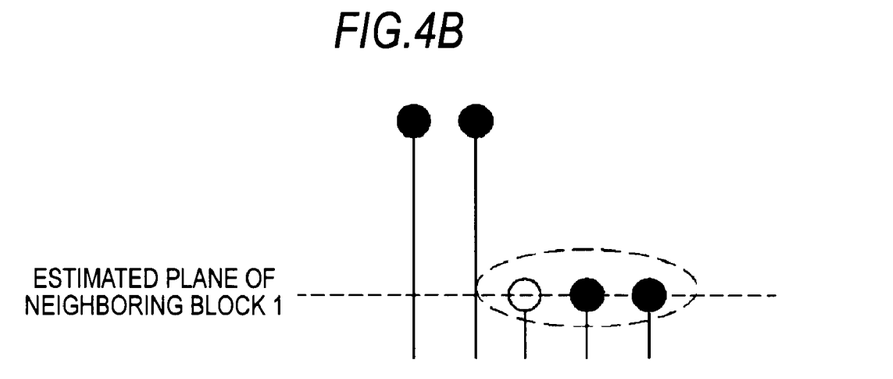
Figure 4C:
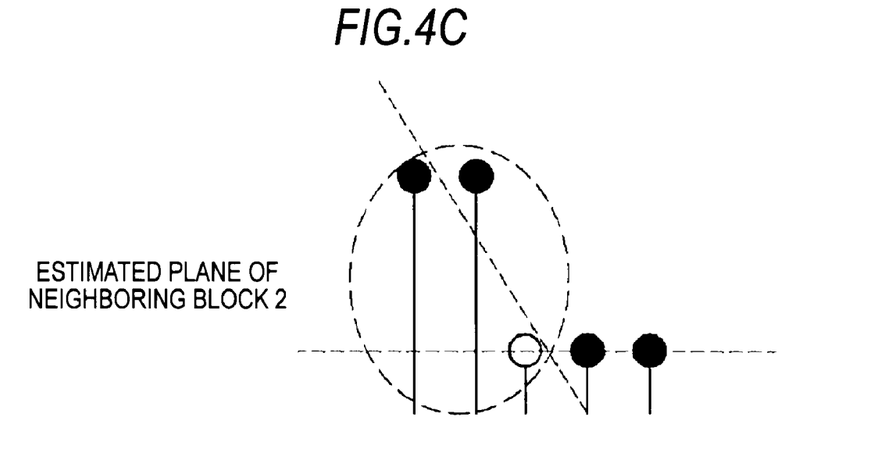
Figure 5B:
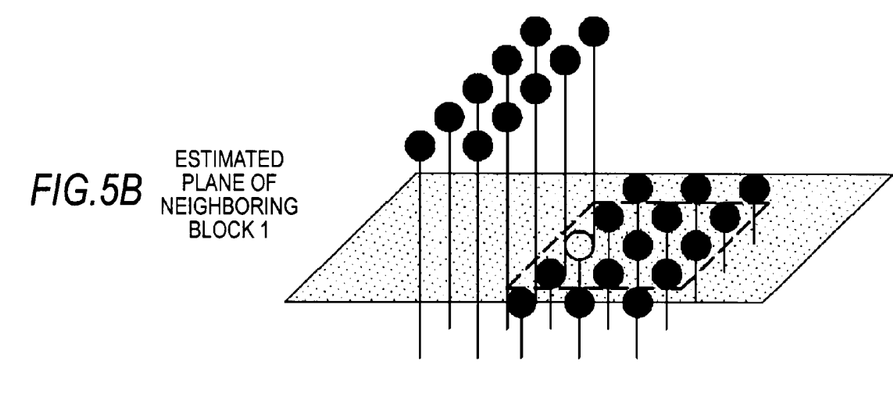
Figure 5C:
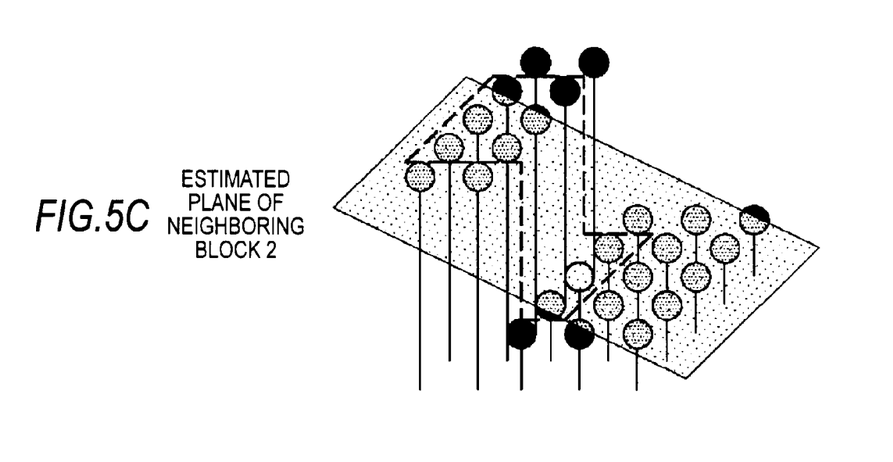

In order to avoid this problem, there is provided processing to calculate estimated planes in the neighboring blocks and select the optimal estimated plane among a plurality of the estimated planes. It thus becomes possible to select a region satisfying the assumption that the pixels in the block containing the reference pixel form a plane. For example, because an estimated plane having a smaller error from the luminance values of the pixels in the block as are shown in FIG. 4B and FIG. 5B is selected as the optimal estimated plane, it becomes possible to preserve the edge portion.

As has been described, the image processing according to the embodiment of the present invention enables denoising of the gradation portion that has been unfeasible in the related art. Also, by calculating estimated planes for the respective neighboring blocks and selecting the optimal estimated plane, it becomes possible to preserve the detailed portion (edge or the like) of the image data. In short, edge preservation and denoising of the gradation portion can be achieved at the same time.

3. Image Processing Example 2

An image processing example 2 will now be described. The image processing example 2 is performed by the same configuration as the image processing device shown in FIG. 2. The weighting factor is calculated in the weighting factor calculation portion 33 by another method. To be more specific, the square value of an error between the luminance value of the reference pixel and a luminance value in the optimal estimated plane at the position of the reference pixel is found to be the weighing factor of the reference pixel. Likewise, the square value of an error between the luminance value of a neighboring pixel and the luminance value in the optimal estimated plane at the position of the reference pixel is found to be the weighting factor of the neighboring pixel.

By using the square value of an error between the luminance value of the image data and the luminance value in the optimal estimated plane as the weighting factor in this manner, as with the image processing example 1 above, edge preservation and denoising of the gradation portion can be achieved at the same time.

4. Modification

According to the embodiments of the present invention described above, the image processing is performed by hardware. However, the image processing can be performed by software. In a case where the image processing is performed by software, a program constituting the software is installed into an information processing device, such as a general-purpose computer. This program is stored (recorded) temporarily or permanently in a recording medium, such as a flexible disk, a CD-ROM (Compact Disc Read Only Memory), a DVD (Digital Versatile Disc), and a semiconductor memory, and provided as so-called package software. Alternatively, the program may be provided by download from a network, such as the Internet.

Figure 6:
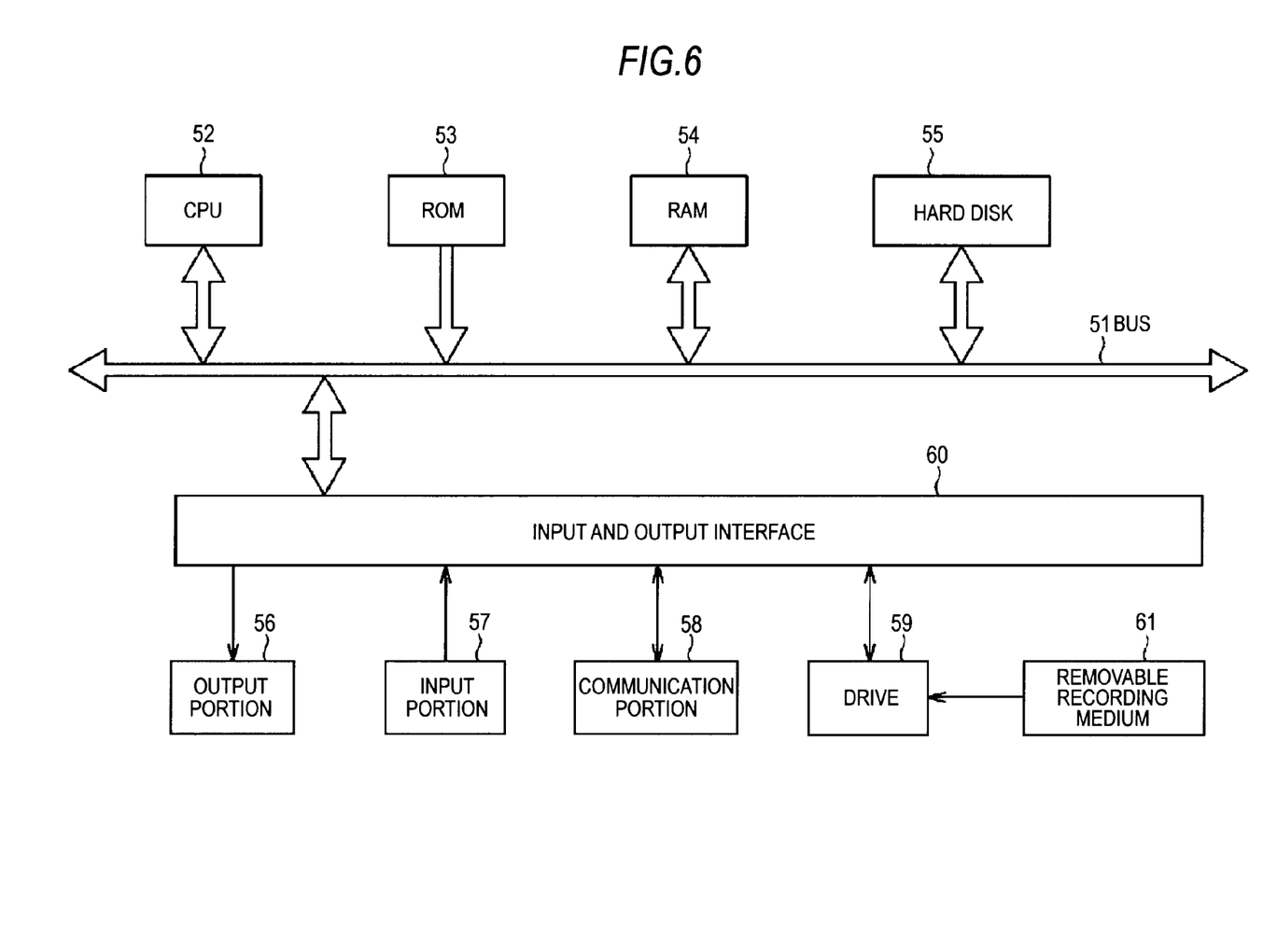
FIG. 6 is a view showing an example of the configuration of an information processing device.

FIG. 6 is a view showing an example of the configuration of the information processing device. The information processing device includes a bus 51, a CPU (Central Processing Unit) 52, a ROM (Read Only Memory) 53, a RAM (Random Access Memory) 54, a hard disk 55, an output portion 56, an input portion 57, a communication portion 58, a driver 59, and an input and output interface 60. The input and output interface 60 is connected to the CPU 52 via the bus 51. When the user operates the input portion 57 formed of a keyboard, a mouse, a microphone, or the like and a command is inputted via the input and output interface 60, the CPU 52 runs a program stored in the ROM 53 according to the command.

Also, the CPU 52 loads a program pre-installed in the hard disk 55 into the RAM 54 and runs this program. The CPU 52 then performs the image processing described above and outputs the processing result to the output portion 56 formed, for example, of an LCD (Liquid Crystal Display) or a speaker.

It goes without saying that the program to perform the image processing described above can be distributed, for example, singly or as a part of an application that edits and manages images taken by the digital camera.

The present application contains subject matter related to that disclosed in Japanese Priority Patent Application JP 2009-003459 filed in the Japan Patent Office on Jan. 9, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a hardware processor including,
an estimated plane calculation portion that calculates, for inputted image data, a plurality of estimated planes defined by luminance values on a block-by-block basis, each block containing a predetermined number of pixels including a reference pixel to be subjected to filter processing;
an optimal estimated plane selection portion that selects an optimal estimated plane having a least summation of errors between luminance values of respective pixels in a block and luminance values in an estimated plane among the plurality of estimated planes;
a weighting factor calculation portion that calculates a weighting factor for the reference pixel on the basis of a luminance value of the reference pixel and a luminance value in the optimal estimated plane; and
a weighted smoothing portion that computes a sum of products of relative luminance differences between the luminance values of the respective pixels in the block and luminance values in the optimal estimated plane and the weighting factor for the reference pixel and adds a luminance value in the optimal estimated plane at a reference pixel position to a result of computation.

2. The image processing device according to claim 1, wherein the weighting factor calculation portion calculates the weighting factor for the reference pixel using relative luminance differences between luminance values of respective pixels in a block having the reference pixel at a center and the luminance values in the optimal estimated plane.

3. The image processing device according to claim 1, wherein the weighting factor calculation portion uses a square value of a luminance difference between the luminance value of the reference pixel and the luminance value in the optimal estimated plane.

4. The image processing device according to claim 1, wherein
the estimated plane calculation portion calculates the estimated planes by a method of least squares; and
the optimal plane selection portion selects an estimated plane having a least square sum of errors found by the method of least squares among the plurality of estimated planes as the optimal estimated plane.

5. An image processing method comprising the steps of:
calculating, for input image data, a plurality of estimated planes defined by luminance values on a block-by-block basis, each block containing a predetermined number of pixels including a reference pixel to be subjected to filter processing;
selecting an optimal estimated plane having a least summation of errors between luminance values of respective pixels in a block and luminance values in an estimated plane among the plurality of estimated planes;
calculating a weighting factor for the reference pixel on the basis of a luminance value of the reference pixel and a luminance value in the optimal estimated plane; and
computing a sum of products of relative luminance differences between the luminance values of the respective pixels in the block and luminance values in the optimal estimated plane and the weighting factor for the reference pixel and adding a luminance value in the optimal estimated plane at a reference pixel position to a result of computation.

6. A non-transitory computer readable storage medium encoded with computer program instructions which when executed by a processor implement a method of image processing, comprising:
calculating, for input image data, a plurality of estimated planes defined by luminance values on a block-by-block basis, each block containing a predetermined number of pixels including a reference pixel to be subjected to filter processing;
selecting an optimal estimated plane having a least summation of errors between luminance values of respective pixels in a block and luminance values in an estimated plane among the plurality of estimated planes;
calculating a weighting factor for the reference pixel on the basis of a luminance value of the reference pixel and a luminance value in the optimal estimated plane; and
computing a sum of products of relative luminance differences between the luminance values of the respective pixels in the block and luminance values in the optimal estimated plane and the weighting factor for the reference pixel and adding a luminance value in the optimal estimated plane at a reference pixel position to a result of computation.

7. An imaging device comprising:
a hardware processor including,
an imaging portion;
an estimated plane calculation portion that calculates, for image data obtained by the imaging portion, a plurality of estimated planes defined by luminance values on a block-by-block basis, each block containing a predetermined number of pixels including a reference pixel to be subjected to filter processing;
an optimal estimated plane selection portion that selects an optimal estimated plane having a least summation of errors between luminance values of respective pixels in a block and luminance values in an estimated plane among the plurality of estimated planes;
a weighting factor calculation portion that calculates a weighting factor for the reference pixel on the basis of a luminance value of the reference pixel and a luminance value in the optimal estimated plane; and
a weighted smoothing portion that computes a sum of products of relative luminance differences between the luminance values of the respective pixels in the block and luminance values in the optimal estimated plane and the weighting factor for the reference pixel and adds a luminance value in the optimal estimated plane at a reference pixel position to a result of computation.

* * * * *